United States Patent [19]

Kumar et al.

[11] Patent Number: 4,954,763
[45] Date of Patent: Sep. 4, 1990

[54] RESOLVER ANALOG TO DIGITAL INPUT MODULE FOR USE IN A PROGRAMMABLE CONTROLLER SYSTEM

[75] Inventors: Shalabh Kumar, Kildeer; Duane Edgar, Lisle, both of Ill.

[73] Assignee: Micro Fast Controls, Inc., Carol Stream, Ill.

[21] Appl. No.: 304,144

[22] Filed: Jan. 31, 1989

[51] Int. Cl.⁵ .............................................. G05B 19/31
[52] U.S. Cl. ...................................... 318/605; 318/603; 318/561; 318/626; 318/692; 341/116
[58] Field of Search ............... 318/605, 603, 561, 626, 318/692; 341/83–85, 116

[56] References Cited

U.S. PATENT DOCUMENTS

| | | | |
|---|---|---|---|
| 3,885,209 | 5/1975 | Lazarus | 318/692 |
| 4,014,014 | 3/1977 | Jones et al. | 341/113 |
| 4,060,799 | 11/1977 | Jones | 318/692 X |
| 4,308,525 | 12/1981 | Simon et al. | 341/113 |
| 4,469,993 | 9/1984 | Swanson et al. | 318/603 X |
| 4,744,022 | 5/1988 | Kumar et al. | 318/626 X |

*Primary Examiner*—William M. Shoop, Jr.
*Assistant Examiner*—Saul M. Bergmann

*Attorney, Agent, or Firm*—Thomas R. Vigil

[57] ABSTRACT

The resolver input module for use in programmable controller systems is one of several modules mounted in a rack to form a programmable controller. The module's function is to provide position data from an externally located resolver which is connected to a machine's shaft to the programmable controller's processor module. This is accomplished by moving the resolver analog-to-digital conversion circuitry from an external module location to the programmable controller input/output rack and coupling this circuitry to circuits which synchronize the programmable controller's input fetch signals. Additionally, a user operable entry mechanism for digitally offsetting the resolver position by a user-selectable amount while accommodating different scale factors is provided. Synchronization and alignment circuitry are provided for synchronizing and aligning data to compensate for different resolver gear ratios in coarse-fine geared resolver decoding circuitry. The resolver input module preferably includes a numerical display of the digitally offset resolver position data. The resolver input module also provides BCD coded output data which is easily connected to such devices as remote digital displays.

21 Claims, 8 Drawing Sheets

FIG. 6 Table A

OUTPUT BIT ALIGNMENT FOR 10-BIT COARSE AND 12-BIT FINE RESOLVER TO DIGITAL CONVERTERS DEPENDING ON COARSE FINE GEAR RATIOS

8:1
$2^9$ $2^8$ $2^7$ $2^6$ $2^5$ $2^4$ $2^3$ $2^2$ $2^1$ $2^0$ [ COARSE ]
X   X   X   X   D   X   X   X   X   X
            C   $2^{10}$
            B
            A
$2^5$ $2^4$ $2^3$ $2^2$ $2^1$ $2^0$ ] FINE OUTPUT -- 15 BITS
Y   Y   Y   Y   Y   Y

16:1
$2^9$ $2^8$ $2^7$ $2^6$ $2^5$ $2^4$ $2^3$ $2^2$ $2^1$ $2^0$ [ COARSE ]
X   X   X   X   X   D   X   X   X   X
                C   $2^{11}$
                B   $2^{10}$
                A
$2^6$ $2^5$ $2^4$ $2^3$ $2^2$ $2^1$ $2^0$ ] FINE OUTPUT -- 16 BITS
Y   Y   Y   Y   Y   Y   Y

32:1
$2^9$ $2^8$ $2^7$ $2^6$ $2^5$ $2^4$ $2^3$ $2^2$ $2^1$ $2^0$ [ COARSE ]
X   X   X   X   X   X   D   X   X   X
                    C   $2^{11}$
                    B   $2^{10}$
                    A
$2^7$ $2^6$ $2^5$ $2^4$ $2^3$ $2^2$ $2^1$ $2^0$ ] FINE OUTPUT -- 17 BITS
Y   Y   Y   Y   Y   Y   Y   Y

64:1
$2^9$ $2^8$ $2^7$ $2^6$ $2^5$ $2^4$ $2^3$ $2^2$ $2^1$ $2^0$ [ COARSE ]
X   X   X   X   X   X   X   D   X   X
                        C   $2^{11}$
                        B   $2^{10}$
                        A
$2^8$ $2^7$ $2^6$ $2^5$ $2^4$ $2^3$ $2^2$ $2^1$ $2^0$ ] FINE OUTPUT -- 18 BITS
Y   Y   Y   Y   Y   Y   Y   Y   Y

128:1
$2^9$ $2^8$ $2^7$ $2^6$ $2^5$ $2^4$ $2^3$ $2^2$ $2^1$ $2^0$ [ COARSE ]
X   X   X   X   X   X   X   X   D   X
                            C   $2^{11}$
                            B   $2^{10}$
                            A
$2^9$ $2^8$ $2^7$ $2^6$ $2^5$ $2^4$ $2^3$ $2^2$ $2^1$ $2^0$ ] FINE OUTPUT -- 19 BITS
Y   Y   Y   Y   Y   Y   Y   Y   Y   Y

FIG. 7
TABLE B

| AB →<br>CD ↓ | 00 | 01 | 10 | 11 |
|---|---|---|---|---|
| 00 | 0 | 0 | 0 | -1 |
| 01 | 0 | 0 | 0 | 0 |
| 10 | 0 | 0 | 0 | 0 |
| 11 | +1 | 0 | 0 | 0 |

EFFECT ON DIGIT D VALUE FOR COMBINATIONS
OF AB AND CD BITS

NOTES:

1. X VALUES ARE COARSE CONVERTER
2. Y VALUES ARE FINE CONVERTER
3. AB ARE TWO MOST SIGNIFICANT BITS OF FINE CONVERTER
4. INCREMENTING OR DECREMENTING D BIT IS CARRIED TO
   MORE SIGNIFICANT X OUTPUT BITS

RESOLVER ANALOG TO DIGITAL INPUT MODULE FOR USE IN A PROGRAMMABLE CONTROLLER SYSTEM

BACKGROUND OF THE INVENTION

1. Field of the Invention

The present invention relates to an improved method of coupling the position data from a resolver to a programmable controller logic processor and to electrical circuitry for achieving such improved coupling.

2. Description of the Prior Art

A typical programmable controller operates on a cycle where input data from input modules is coupled to the logic processor in a processor module of the programmable controller. The input data is input to the user program, the user program is sequentially computed, and then output data is coupled from the processor module to output modules. This input-computer-output process is continuously repeated. The elapsed time from input to output is usually several tens of milliseconds. Also, the processor sequentially reads the data from each input module and sequentially writes the data to each output module. The elapsed time to either read or write eight bits of input or output data from one input module or to one output module is typically about 10 microseconds.

In the prior art, programmable controller systems have been coupled to a resolver where analog signals were generated by the resolver indicating different positions of a machine shaft coupled to the resolver. Typically this was achieved using two modules: one being an analog to digital decoder module and the other module being a coupling module for coupling the digital signals to the controller processor, commonly referred to as a PC handshake module. Very often these two modules were mounted with or within the housing for the resolver located at a position some distance from the programmable controller. As a result, the converted digital signals and the handshake signals were transmitted over a transmission line to the programmable controller logic processor.

The transmission line often times picked-up other signals (static and electromagnetic noise signals) resulted in the adding of noise to the digital signals coming from the PC handshake module and resulted in problems in decoding the digital signals in an input module coupled between the PLC (Program Logic Controller) backplane (I/O interface) and often times erroneous signals were picked up.

As will be described in greater detail hereinafter, according to the teachings of the present invention, the analog signals from the resolver are coupled by a transmission line directly to a resolver decoder circuit module forming part of a programmable controller system.

The resolver analog signals are fairly strong signals and are not affected by noise picked up by the transmission line between the resolver and the resolver decoder circuit module associated with the programmable controller system. As a result, the resolver decoder circuit module, and more particularly, the electrical circuitry therein, accurately convert the analog signals to digital signals which are transmitted via short transmission lines to the programmable controller logic processor. In this way, the digital signal converted from the resolver analog output signal by the resolver decoder circuitry, is a more accurate and stable signal indicative of machine shaft position.

In other words, according to the teachings of the present invention, the accuracy of a shaft position determination is enhanced by coupling the analog output signals from a resolver directly to a resolver decoder circuit module forming part a programmable controller assembly.

A typical prior art resolver analog-to-digital decoder circuit module provides a sinusoidal excitation frequency to the rotor winding of a resolver. The resolver has two stator windings which are physically located 90° of shaft rotation apart. As the resolver shaft rotates through 360°, one stator winding will have its voltage and phase vary to correspond with the sine of the shaft angle, and one stator winding will have its voltage and phase vary to correspond with the cosine of the shaft angle. Resolver analog-to-digital decoder circuitry will couple the excitation frequency and the two stator winding voltages to circuitry that will convert these signals to a binary-weighted representation of the resolver's shaft angle. There also may be circuitry in the resolver analog-to-digital decoder circuitry for converting the binary-weighted shaft position data to BCD coded information. The resolution of the shaft angle is typically one part in 4096 but may be as high as one part in 65,536. Typical shaft rotation speeds range in excess of 1800 RPM.

In some embodiments of a prior art controller system coupled to a resolver, the machine's shaft is directly coupled to a fine resolver while being geared down to a coarse resolver. A typical arrangement would be to have the fine resolver turn 128 times to one turn of the coarse resolver. The resolvers are connected to two resolver analog-to-digital converter circuits as previously described. Because it is difficult to align the two resolvers exactly in a practical arrangement, at the transition points of the coarse resolver output signals there will be a conflict of the readings of the coarse and fine resolver analog-to-digital converter circuits which have a binary-weighted output unless additional logic circuits are employed to provide an unambiguous digital output.

In such an arrangement, the number of the most significant bits of the coarse resolver analog-to-digital converter circuit output corresponding to the gear ratio is an output which has been adjusted according to the relationship of the coarse and fine positions as the most significant bits while the output of the fine resolver analog-to-digital converter is used directly to represent the lower order bits of the shaft position.

In a coarse to fine ratio of 128:1 where the coarse resolver analog-to-digital converter circuit resolution is ten bits and the fine resolution is twelve bits, the binary-weighted position's most significant seven bits will be the adjusted output of the coarse resolver-to-digital converter circuit while the twelve lower order bits will be the output of the fine converter. The binary weighted output, then, can range from 0 to 7FFFF hexadecimal or 524,287. Without using a microprocessor, it is very difficult to first translate such a number to more usable position codes such as 0 to 128,000 Binary Coded Decimal (BCD) and then allow the user to easily offset that position with a decimal number module. The output code will require different circuitry for every gear ratio and every different output code.

Even at moderate shaft speed and typical resolution, multi-byte output data from the resolver analog-to-digital conversion circuitry can be easily updated so that, without synchronization, the data will change from the time that a programmable controller can store the first byte to the time when succeeding bytes can be read, resulting in an output error. As an example, suppose that the resolver analog-to-digital data can vary from 0 to 3599 and that the programmable controller reads first the low eight bits and then the next highest eight bits. Also suppose that when the first eight bits is read, the data is 1999, and the processor correctly reads 99 but before the processor can read the second byte, the data changes to 2000. The processor will then read 20 and the data changes to 2000. The processor will then read 20 and the data that is stored is the incorrect value of 2099. To overcome this problem, a synchronization interface from the resolver analog-to-digital decoder to the programmable controller input modules is either incorporated into the resolver analog-to-digital decoder or added as an external module.

Synchronization interface circuitry can be provided to receive a digital transition from a programmable controller output module at its input and then freeze the value of the resolver analog-to-digital decoder's output data after a fixed amount of time, thereby enabling the programmable controller to read the correct data value.

One difficulty with this approach is the additional delay and programming overhead of having the programmable controller first output data and then read the input data. Another difficulty is that additional modules external to the programmable controller are required to convert the resolver shaft position to digital position and secondly, to synchronize the data to the programmable controller's input/output scan.

In addition, the conventional input modules necessary to read the data into the programmable controller are, in themselves, expensive.

Also, with rapidly changing input position data, from the time that an external synchronization circuit freezes the position data until such time that the programmable controller can input the data, the position may have changed so much that computed decisions based on the position data may have little value.

As will be described in greater detail hereinafter, according to the teachings of the present invention a resolver decoder input module is provided which includes a resolver, synchronization logic circuitry for electrically aligning the digital data bits converted from an analog coarse resolver signal with the digital data bits converted from an analog fine resolver signal to ensure correct digital data at transitions from numbers such as 1999 to 2000.

Further, as will be described in greater detail hereinafter a user entry mechanism such as thumbwheel switches and PROM conversion circuitry are provided in the resolver decoder input module of the present invention for enabling entry of a binary coded decimal offset and conversion of same to a digital signal for combining with the converted resolver digital signal.

Such PROM conversion circuitry is not affected by the scale factor, has a scale factor incorporated therein and can accommodate different scale factors.

Also, PC handshake circuitry is provided in the resolver decoder input module of the present invention in the form of position change lockout circuitry.

SUMMARY OF THE INVENTION

According to the teachings of the present invention, a resolver decoder input module is provided in a programmable controller system and occupies one or more bus connection slots in a rack of a programmable controller and is connected to a backplane of the controller. Either a single resolver or a multiple, geared resolver that is coupled to a machine shaft is wired directly to the resolver input module.

The module decodes the analog sine and cosine signals from the resolver to a digital value. The function of the input module is to provide a digital, BCD, binary, or gray code value to the programmable controller processor that is offset by a variable, user-selectable decimal amount. The full-scale position data value sent by the input module to the processor usually differs from the full-scale binary values that are output by the resolver. The position data's fullscale value sent by the input module to the processor is called the Scale Factor.

Additionally, the resolver decoder input module may provide visual position indication and an external auxiliary digital position output.

The module, when configured for multiple, geared resolver input, employs circuitry that will easily allow itself to be adjusted for various gear ratios. Decoding of the position offset value is entered by the user with BCD thumbwheel switches. Since this value is adjusted by Programmable Read Only Memories (PROM) and the sum of the offset and the position data is separately decoded by PROM's into the final position value, virtually any gear ratio and output scale factor may be accommodated with the same circuitry.

For example, the circuitry that is used to obtain a 0–350 output or a 0–999 output is the same. Only the program in the PROM's is different.

The digital position data is optically isolated from the connection to backplane of the controller. When the processor reads the resolver input module's data, the processor sequentially reads data starting at the lowest module number until the data has been read from the highest numbered input module.

Instead of depending on time delays from a signal sent by the processor to an output module to synchronize the resolver position decoding circuitry to the processor's scan, the resolver input module detects the processor's first read of the input module and causes a position change lockout circuit to inhibit the position data update until the end of the last read of the resolver input module. This position change lockout circuit functions as a PC handshake circuit. By synchronizing the inhibition of data updates to the actual processor input cycle, no additional circuitry is required and the position data sent by the resolver input module to the processor is the latest and most timely available.

Thus, according to the invention there is provided in a programmable controller system which is coupled to a resolver and which includes a rack mounting circuit modules and having a PLC backplane (a circuit connector board) and a programmable controller logic processor connected to said backplane, the improvement comprising a resolver analog-to-digital circuit module mountable in the rack for being coupled directly to and through said PLC backplane to said logic processor and transmission line coupling means for coupling analog output signals from a resolver to said resolver analog-to-digital decoder circuit module forming part of said controller system.

Further according to the invention there is provided a programmable controller system comprising ratiometric resolver analog-to-digital decoding circuitry adapted to be coupled to a resolver and means for digitally offsetting the digital resolver position output signal from said decoding circuitry by a user selectable amount.

Preferably, the means for digitally offsetting the digital resolver position output signal includes offset conversion PROM circuitry.

Still further according to the invention there is provided for use with a programmable controller adapted to be coupled to the output of a resolver, a resolver analog-to-digital decoder circuit module comprising; resolver signal analog-to-digital conversion circuit means, entry means for entering an offset factor to said circuit means, converting means coupled to said entry means for converting an entered binary coded decimal to a digital signal, means for combining the digital output signals from said converting means and from said resolver conversion circuit means, and means for scaling the output of the combined signal.

Additionally according to the invention there is provided a resolver decoder input circuit module comprising resolver conversion circuitry including analog-to-digital resolver signal converting circuit means for providing a digitized resolver signal and means for coupling said digitized signal to an I/O bus coupled to a logic processor of a programmable controller system, said circuit means including position change lockout circuit means for synchronizing the supplying of the digitized resolver signals to the logic processor with the operation of the logic processor.

DESCRIPTION OF THE PREFERRED EMBODIMENT

Figure 1:
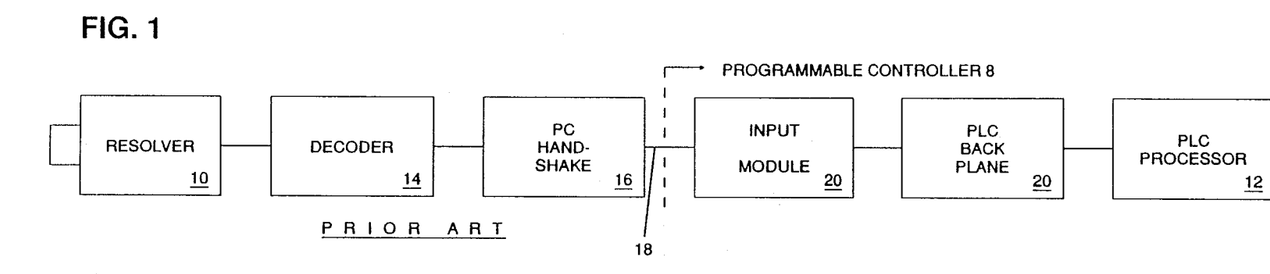
FIG. 1 is a block schematic circuit diagram of prior art circuitry utilized, for connecting a resolver to a programmable controller system.

In FIG. 1 there is illustrated a prior art system including a programmable controller 8 for connecting a resolver 10 to a programmable logic controller (PLC) processor 12 often referred to as a logic processor 12 of the controller 8. In this prior art system, resolver decoder (analog-to-digital) circuitry 14 is directly coupled to the resolver 10 or mounted within a housing for the resolver 10. Also physically coupled to the resolver decoder circuitry 14 or mounted within the resolver housing is programmable controller (PC) handshake circuitry 16 for effecting communication of the analog-to-digital signals from the resolver decoder circuitry 14 to the PLC processor 12.

The output signals from the resolver are preferably ratio metric signals which are ratios of the voltage output of one winding to the voltage output of another winding in the resolver. Such ratio metric signals are independent of frequency and amplitude. A description of such signals can be found in the section entitled Fundamental Mathematical Relationships in Synch-/Resolver Equipment in the handbook SYNCHRO CONVERSION, 2nd Edition, published Nov. 1988 by ILC Data Device Corporation, Bohemia, N.Y., pages 3–7, the disclosure of which is incorporated herein by reference.

Typically, the resolver 10 is mounted adjacent to and connected to a machine shaft at some distance from the location of the programmable controller 8 and the PLC processor 12 thereof. Accordingly, the output from the PC handshake circuitry 16 is transmitted over a relatively long transmission line 18 to an input module 20 of the programmable controller assembly 8. The input module 20 in turn is connected to a so-called programmable logic controller (PLC) backplane (I/O interface bus) which is connected to the PLC processor 12.

As a result of having a long transmission line, noise is picked up by the digitized resolver output signals and the digital data received by the input module 20 is often times distorted or incorrect. This leads to problems in the proper functioning of the programmable controller 8.

Figure 2:
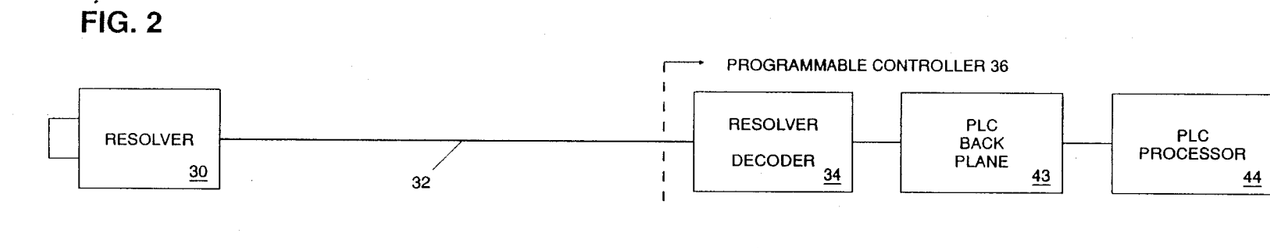
FIG. 2 is a block schematic circuit diagram of circuitry utilized to couple a resolver to a resolver decoder circuit module constructed according to the teachings of the present invention and utilized in programmable controller system.

According to the teachings of the present invention and as shown in FIG. 2, this problem is solved by connecting the analog signals from a resolver 30 directly over a transmission line 32 to a resolver decoder input circuit module 34 which forms part of a programmable controller 36 and is typically mounted in a rack of the programmable controller assembly. Such a resolver decoder circuit module 36 fits easily into the rack of the controller assembly and has resolver decoder circuitry 38 (FIG. 4) therein including analog-to-digital conversion circuitry 40 (FIG. 4) and PC handshake or control circuitry 42 (FIG. 4) which is coupled directly from the module 34 to a PLC backplane 43 which in turn is connected directly to a PLC processor 44 or logic processor 44.

Figure 4:
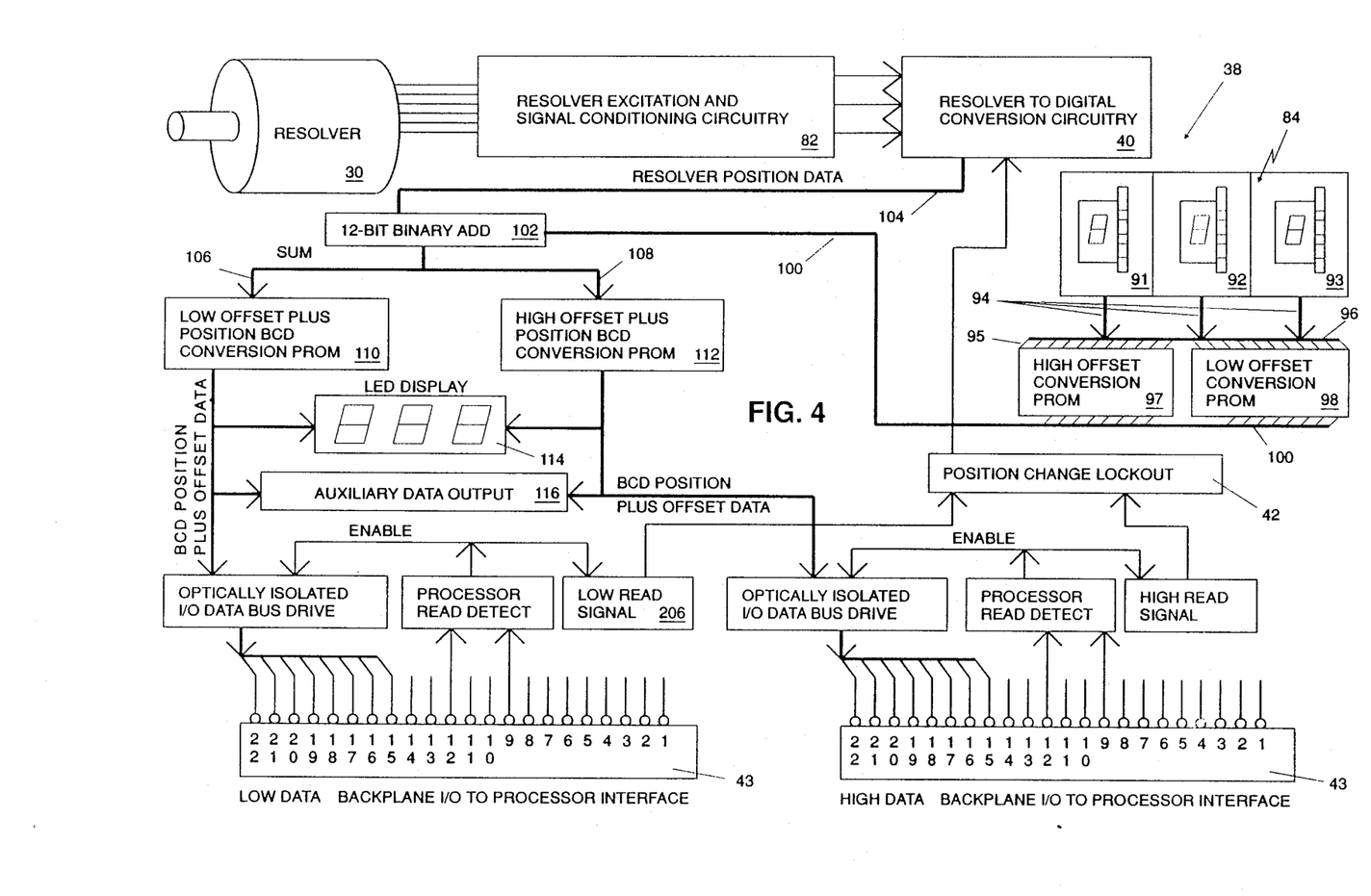
FIG. 4 is block schematic circuit diagram of the electrical circuitry in the resolver decoder circuit module shown in FIG. 2.

The analog signals are very strong and fairly clear such that the amount of distortion due to noise or other extraneous signals picked up by the transmission line 32 are minimal and rarely hamper or prevent the resolver decoder circuitry 42 (FIG. 4) from sensing the correct analog signal and correctly converting the analog signal to a digital signal for supplying same to the PLC back plane 43 (FIG. 4) and to the PLC processor 44 (FIG. 4).

Figure 3:
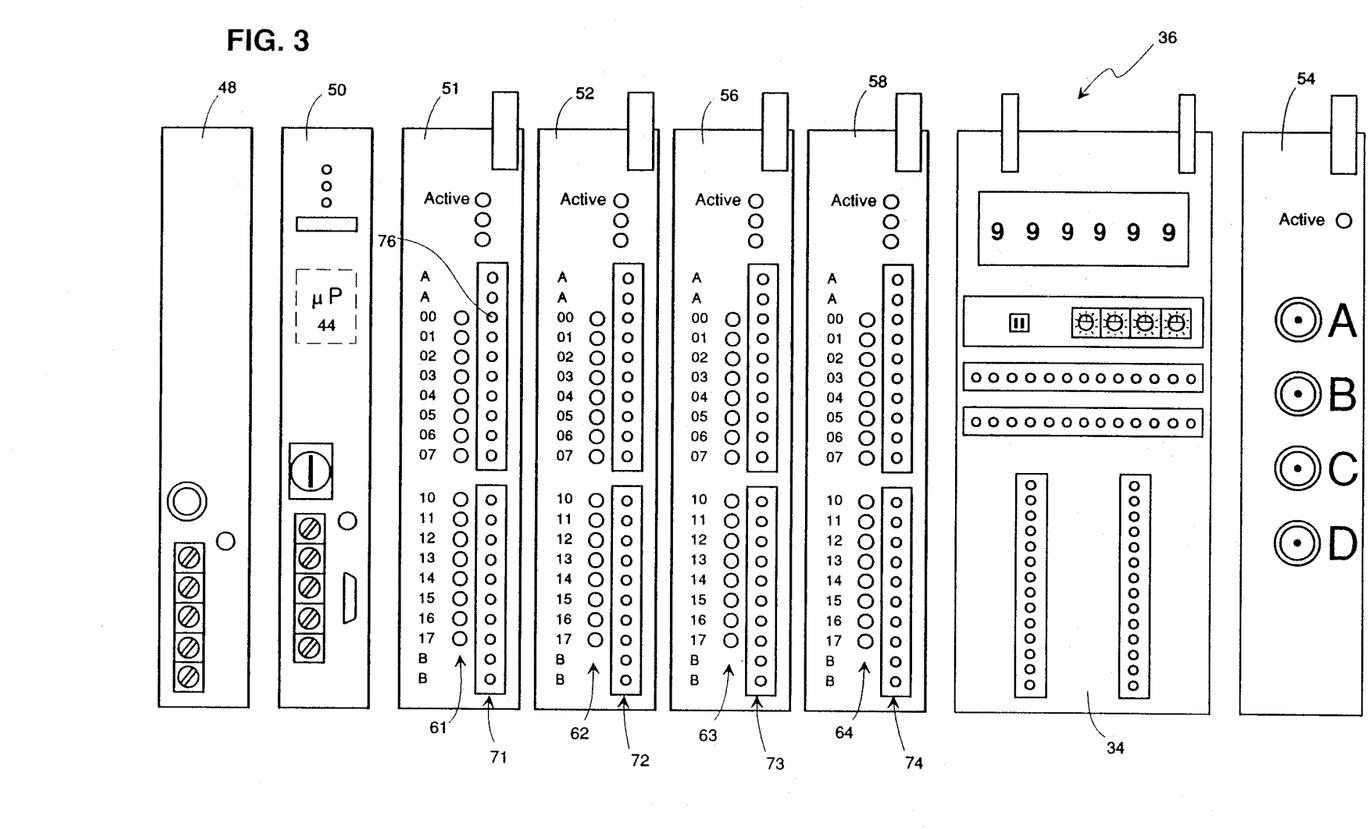
FIG. 3 is a front elevational view of a front panel of a programmable controller assembly (which is mounted in a rack of the assembly) and shows the front end of several resolver decoder output modules constructed according to the teachings of the present invention.

Referring to FIG. 3, the resolver decoder input circuit module, or single resolver input module 34 of the present invention is one of eight modules in the programmable controller 36, which modules are carried upright in two side-by-side arrangements in a rack (not shown). Besides the resolver input module 34 there are a power supply module 48, a processor module 50, two input modules 51, 52, an analog load cell module 54, and two output modules 56 and 58. All of the modules are confined between the spaced apart sidewalls of the rack.

The rack can be of different size so that a greater or lesser number of input/output modules can be accommodated.

The processor module 50 is connected to the input modules, 34, 51 and 52 and output modules, 56, 58 through the backplane 43 which is an I/O circuit bus realized by a printed circuit board that is physically located behind or beneath all of the modules.

The power supply module 48, the processor module 2, the input modules 34, 51, 52, 54 and the output modules 56, 58 are formed by printed circuit boards (not shown) which carry electronic components that are partially covered around the outside of the printed circuit boards. The modules, 34, 48, 50, 51, 52, 54, 56 and 58 slide into slots formed by upright closely spaced guides (not shown) in the rack (not shown), and in this position, their printed circuit boards each present a back edge that engages an edge connector (not shown) mounted on the backplane printed circuit board.

Columns 61, 62, 63, 64 of LED (light emitting diode) status indicators 61, 62, 63, 64 are physically located next to their respective terminals in terminal blocks 71, 72, 73, 74 of the input modules 51, 52 and output modules 56, 58 on the front surface of the modules 51, 52, 56 and 58.

The terminal blocks 71-74 have terminal receptacles, e.g., receptacle 76 in terminal board 71, to which power and control wiring which is used to control a machine or process are attached are removable from plugs (not shown) mounted on the input modules, 34, 51, 52 and 54 and from the output modules 56, 58 with wiring intact.

The input modules 34, 51, 52 and 54 and the output modules 56, 58 form an interface between the processor module 50 and the input and output devices (not shown) associated with the machine (not shown). Input modules 51, 52 are typically connected to switch-type devices such as photoelectric controls, switches, and proximity sensors.

Figure 5A:
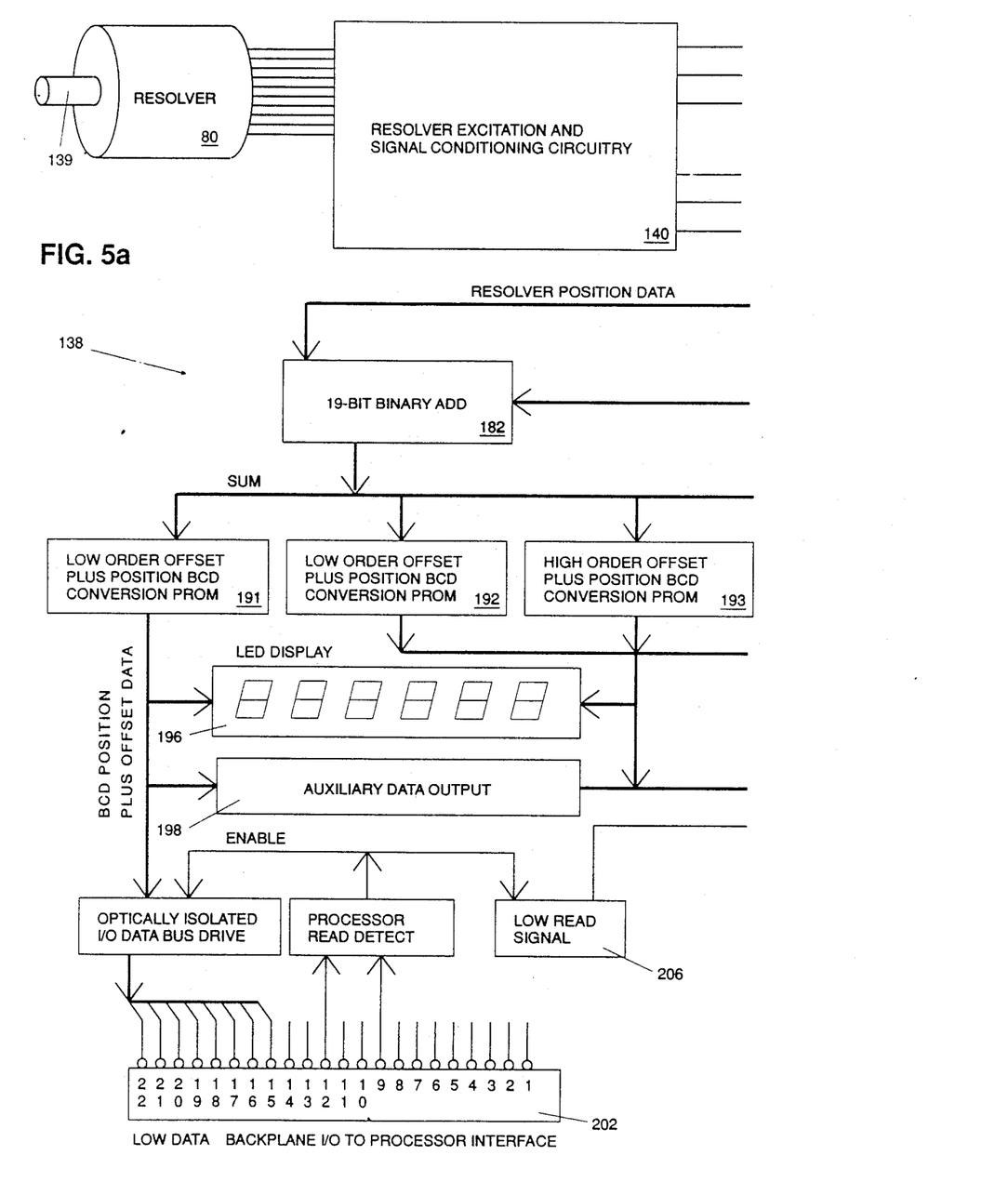
FIGS. 5A, 5B, and 5C are block schematic circuit diagram of the electrical circuitry in a resolver decoder circuit module constructed according to the teachings of the present invention for use in a programmable controller system which is coupled to a multiple, geared resolver input.

The resolver input module 34 is connected to either a single resolver 30 or a dual geared resolver 80 (FIG. 5A).

A dual resolver system commonly referred to as a synchro system includes two resolvers, one being a "Coarse" synchro resolver and the other being a "Fine" synchro resolver. Such a system is described at pages 8-11 and at pages 27-28 in the handbook SYNCHRO CONVERSION, 2nd Edition, published by ILC Data Device Corporation, the disclosure of which is incorporated herein by reference. Further, such synchronized multispeed transducer systems are disclosed in the Jones et al. U.S. Pat. No. 4,014,014 and the Jones U.S. Pat. No. 4,060,799, the disclosures of which are incorporated herein by reference.

Input module 54 is typically connected to analog input signals such as load cells and pressure transducers.

The signals from a group of such sensing devices can be multiplexed to form words of digital data that are read by the logic processor 44.

Output modules 56, 58 are typically connected to such devices as relays, contactors, solenoid valves, and motor starters to receive digital data from the processor 44 and to distribute or demultiplex this data in the form of command signals for operating the output devices.

In some embodiments, the output modules 56, 58 may demultiplex and convert the output digital data from the processor 50 into analog signals for such devices as motor drives.

In FIG. 4 is illustrated a block schematic circuit diagram of the resolver conversion circuitry, constructed according to the teachings of the present invention for a single resolver (resolver 30) input. The resolver 30 which is connected to a machine or process, is wired to a terminal block on the resolver input module 30. The sinusoidal excitation voltage from the module's resolver excitation and signal conditioning circuitry 82 is connected to the resolver's rotor winding while the resolver's sine and cosine windings are connected via conventional differential amplifiers in the signal conditioning circuitry 17 to the sine and cosine inputs of the resolver analog-to-digital conversion circuitry 40.

The output of the resolver analog-to-digital conversion circuitry 40 is a n-bit binary weighted number that represents the resolver shaft position value as a number between 0 and $2_n - 1$. A user offset thumbwheel switches 91, 92, 93 mounted beneath the resolver input module 34 top cover. Four-bit output lines 94 of the three thumbwheel switches are connected to the address input connections 95, 96 of a low offset conversion PROM 97 and a high offset conversion PROM 98. Since the conversion PROMS 96 and 98 address inputs are binary weighted while the thumbwheel switch outputs 94 are BCD weighted, the number selected for PROM output and supplied on address lines 94, 96 needs to be converted for further calculation to a decimal number.

For example, if the thumbwheel switches 91-93 are set at 999, the number selected is hexadecimal 999 which is 2457 decimal value. Before calculating the PROM output value at address 999 hexadecimal, one needs to represent the hexadecimal address as a decimal value of 999. In order to program correct conversion values into the PROMS 97 and 98 for a selected output code, two values need to be supplied: first, the resolution of the resolver-analog-to-digital conversion circuitry 40 and second, the desired output scale factor. The formula used to calculate the PROM's data at each address is the (address represented as decimal) Address X $(2^n) - 1 -$ Scale Factor where n is the number of bits of resolution of the resolver analog-to-digital conversion circuitry 40.

As an example, if the thumbwheel value is 999, the output scale factor is 999 and a 12-bit-resolver-to-digital converter is used then 999×4095+999=4095 or FFF hexadecimal (the actual representation in PROM's 97 and 98) is then supplied to address lines 100.

The offset conversion PROM's 97 and 98 output data on address lines 100 is then added by a 12-bit binary add circuit 102 to the output on lines 104 from the resolver analog-to-digital conversion circuitry 40 and the sum is connected to the address line inputs 106, 108 of Low and High output conversion PROMS 110, 112.

When programming the output conversion PROMS 110 and 112 the output data at each address is (address X Scale Factor +1)-/$2^n$ where n is the number of bits of resolution of the resolver analog-to-digital conversion circuitry 40.

To carry the former example through to a conclusion, the offset thumbwheel switches 91-93 are set to 999 which selects the value of FFF hexadecimal at the output of the offset conversion PROMS 97 and 98 which are in turn connected to the 12-bit binary add circuitry 102. If the value of the position output of the resolver analog-to-digital conversion circuitry 40 is 85A hexadecimal then the twelve lines representing the sum which are connected to the address inputs of the output conversion PROMs 110 and 112 will equal FFF +85A or output conversion PROM address 859 hexadecimal.

The data contained at address 859 hexadecimal (2137 decimal) is, in this case, (2137×1000)÷4096 or 521.

The scale factor, the resolution of the resolver analog-to-digital conversion circuitry 40, and the final output code are the three factors that determine the output data range and value.

When the user offset thumbwheel switches 91-93 are decoded by the low and high offset conversion PROMS 97, 98 and the decoded offset value is added to the position data from the resolver analog-to-digital conversion circuitry 40 by the Low and High output conversion PROMs 110, 112, the three factors that determine the output characteristics of the resolver input module 34 are: Scale Factor, resolution of the resolver analog-to-digital conversion circuitry 40, and the output code (BCD, binary, gray code). They can be all controlled only by the values that are programmed into the offset conversion PROMS 97 and 98 and the output conversion PROMS 110 and 112. Thus, any output Scale Factor or output code can be provided by the same circuitry 38 with little or no modification.

Preferably, a digital display 114 of the decoded offset resolver position and an auxiliary digital output 116 are provided for connection to equipment external to the programmable controller 36.

PC handshake is achieved with the position change lockout circuitry 42 which locks the position value being read and processed by the logic processor 44 until the processor 44 has completed its processing of that position value.

Figure 5B:
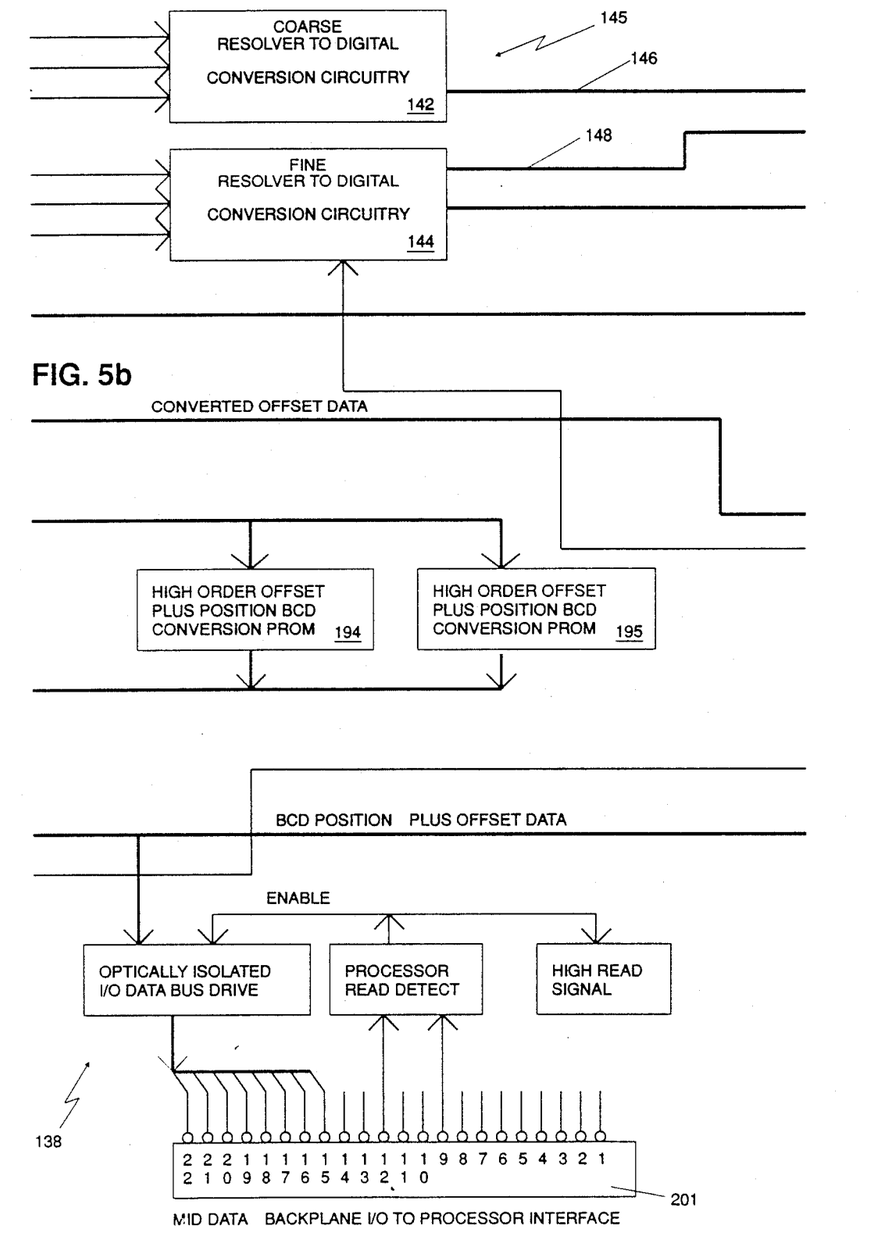
Figure 5C:
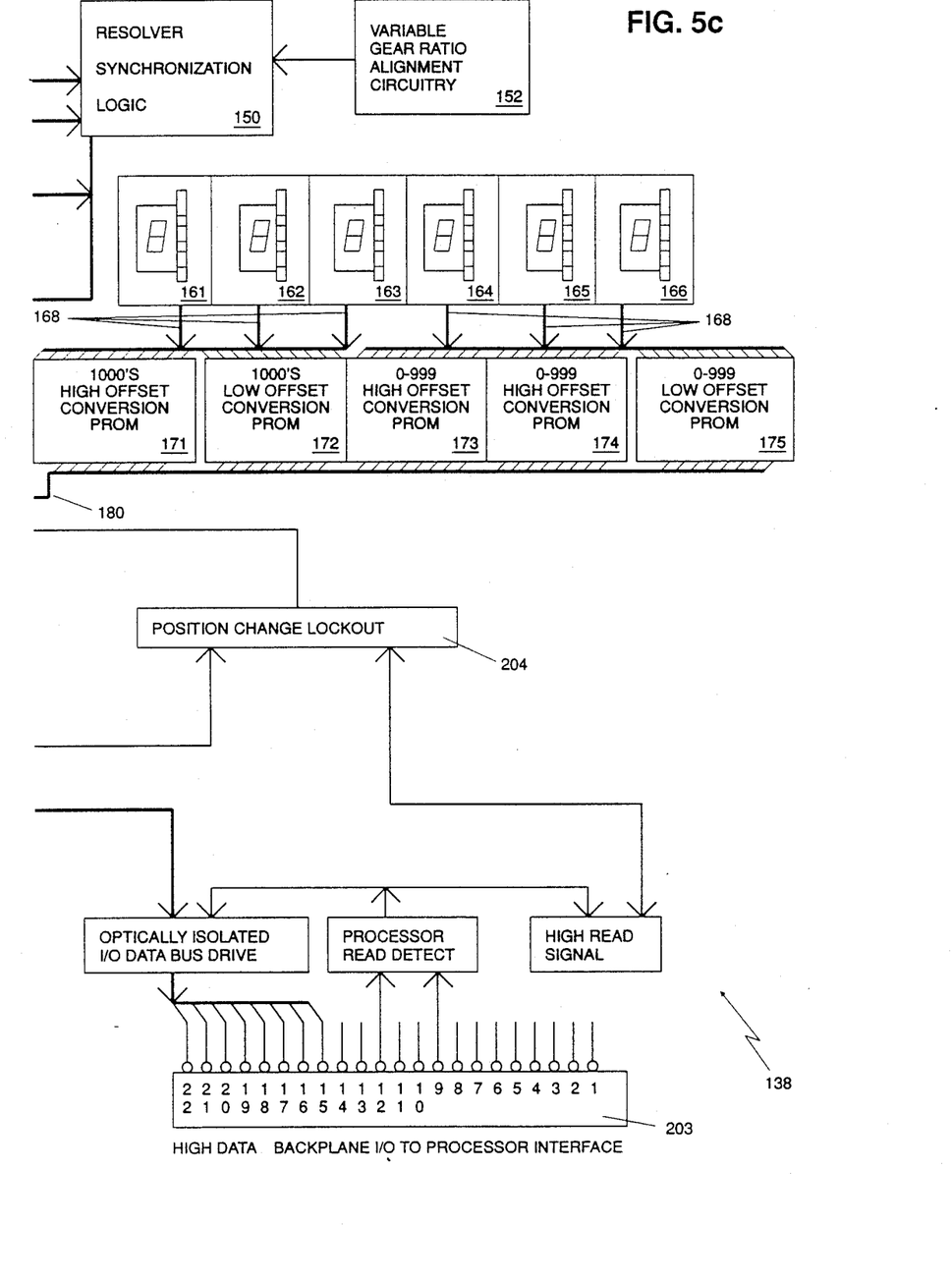

FIGS. 5A-5C are a block schematic diagram of dual resolver input module circuitry 138 for the dual, geared resolver 80. The resolver 80 comprises a fine resolver (not shown) that is connected directly to an input shaft 139 which in turn is attached to a machine or processor, a gear train (not shown) which is connected to the input shaft 139 and whose output shaft rotates at a partial revolution for each full revolution of the input shaft 139, and a coarse resolver (not shown) whose input shaft is attached to the gear train output shaft. The two internal resolvers are wired to a connector which, in turn, is wired to a terminal block on the resolver input module 34.

The sinusoidal excitation voltage from the module's resolver excitation and signal conditioning circuitry 140 is connected to both resolvers' rotor windings while the coarse and the fine resolvers' sine and cosine windings are individually connected via conventional differential amplifiers in the signal conditioning circuitry 140 to the sine and cosine inputs of coarse and fine resolver analog-to-digital conversion circuits 142, 144 defining together resolver analog-to-digital conversion circuitry 145. The outputs 146, 148 of the coarse and fine resolver analog-to-digital conversion circuits 142, 144 are n-bit binary weighted numbers that represent the number of full and partial revolutions of the resolver input shaft 139 as numbers between 0 and $(2^n)-1$ where n is the resolution of the coarse and fine resolver analog-to-digital converter circuits 142, 144.

Figure 6:
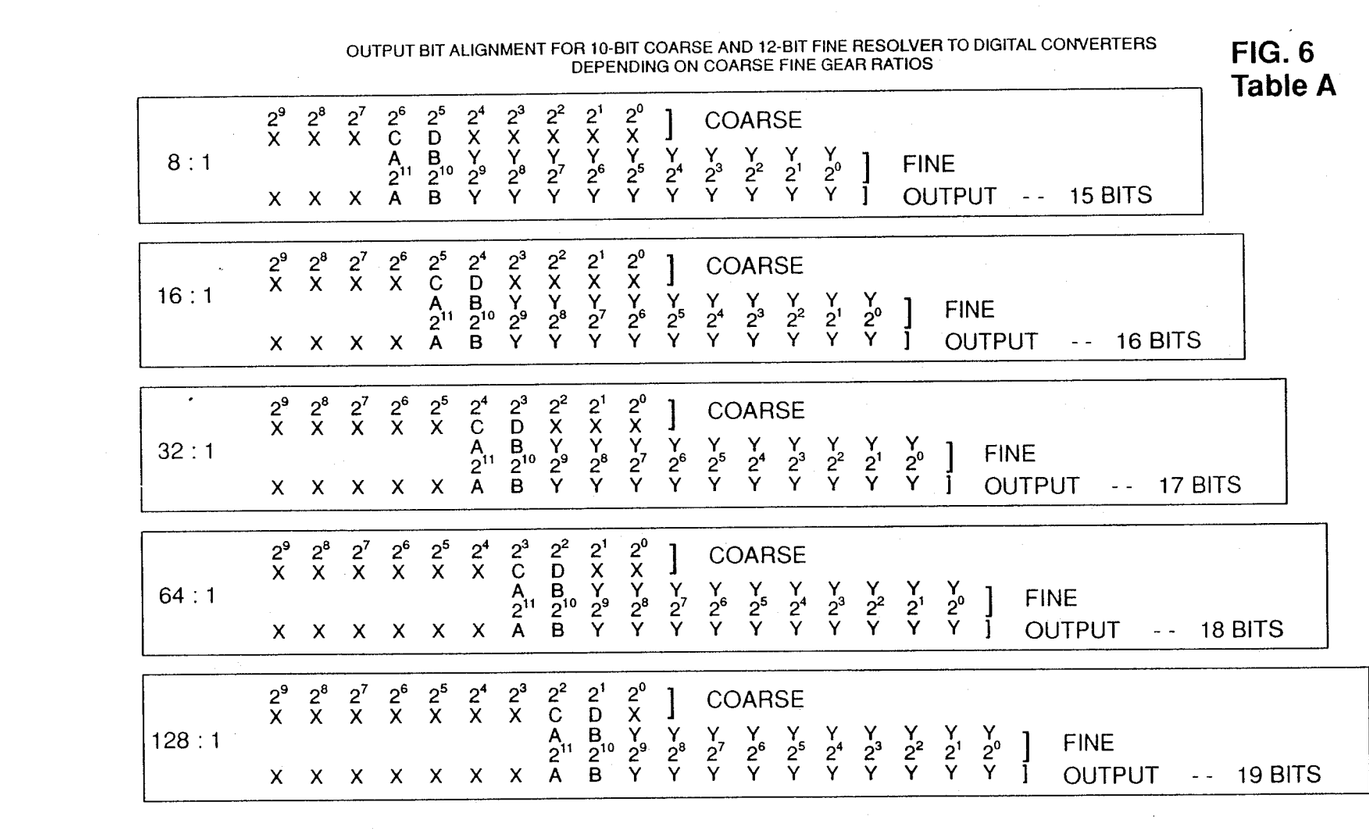
FIG. 6 is one table which summarizes the bit alignment and electronic synchronization of a coarse and a fine resolver analog-to-digital converter for different resolver gear ratios.

FIG. 5 is a Table A that depicts the task of variable resolver synchronization logic circuitry 150 and the variable gear ratio alignment circuitry 152 in the dual resolver input module circuitry 138. The alignment circuitry 152 essentially left shifts the data for output from the coarse resolver once for every power of two of the gear train as shown in Table A. The variable synchronization logic circuitry 150 selects the two immediate less significant bits than those output from the shifted coarse resolver data (C and D) for comparison to the two most significant bits of the fine resolver data (A and B) for the purpose of zero position misalignment compensation of the coarse and fine resolvers as shown in Table B in FIG. 7. As the Table B in FIG. 7 shows, if the C and D bits from the coarse resolver data are both 0 while the A and B bits from the fine resolver data are both one, then 1 is subtracted from the D bit which will affect all of the more significant bits of the coarse resolver data selected for output.

Again referring to FIG. 7 if the C and D bits are both one while the A and B bits are both 0, then one is added to digit D, effectively incrementing the coarse resolver data selected for output.

Figure 7:
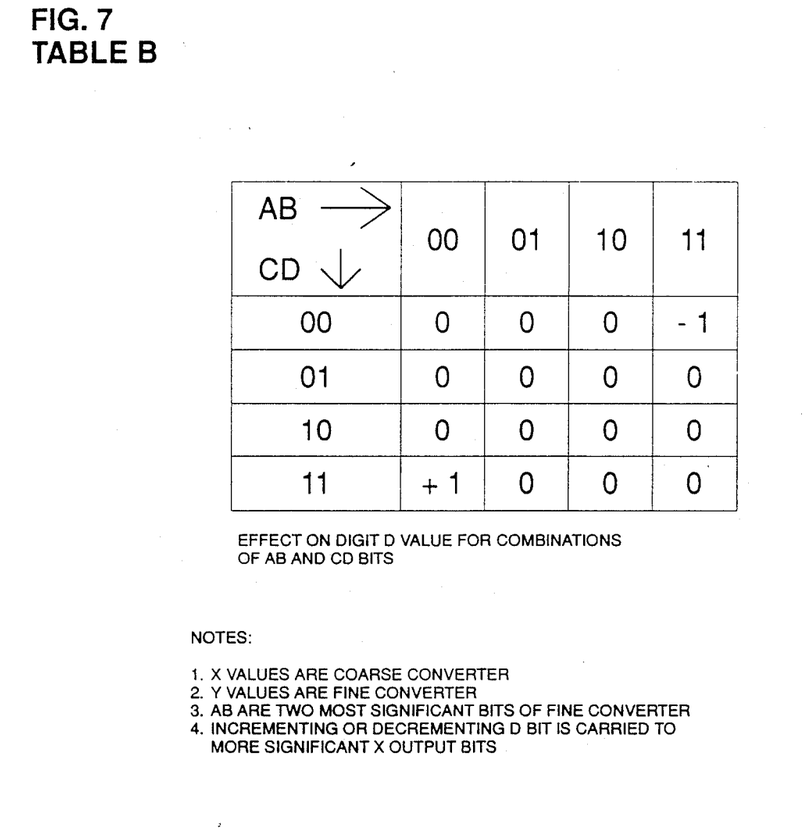
FIG. 7 is another table which shows the effect on the digit D value for combinations of AB bits and CD bits.

As can be seen from FIGS. 6 and 7, if alignment and synchronization circuitry are wired only for a particular gear ratio, then use of the same circuitry for different gear ratios is precluded. If, however, the most significant bits from the coarse resolver analog-to-digital conversion circuit 142 are multiplexed according to a simple two-or-three-bit code effected with switches or jumper wires, then the same circuit 142 can be used for dual, geared resolvers with a variety of gear ratios.

In other respects, the circuitry 138 in FIGS. 5A-5C comprises an expansion of the circuitry 38 in FIG. 4. Thus the circuitry 138, in a manner similar to the circuitry 38 in FIG. 4, includes user entry thumbwheel switches 161-166, input address lines 168, offset conversion PROMS 171-177 and address output lines 180 connected as shown in FIG. 5C, a 19 bit binary add circuit 182 (FIG. 5A) and conversion PROMS 191-195 connected as shown in FIGS. 5A and 5B.

As shown in FIG. 5A, an LED display 196 and an auxiliary data output circuit 198 are provided and connected as shown. The digitized resolver data is supplied to PLC backplanes 201, 202, and 203 and a position change lockout circuit 204 synchronizes the supplying of digitized resolver data to the logic processor 44.

The processor module 50 is connected via backplane edge connectors to the resolver input module 34 (containing circuitry 38 or 138) in such a fashion as to be able to read 16 or more bits of data, eight bits at a time. The first reading of the resolver input module 34 fetches the lowest eight bits of position data, the next reading reads the next eight bits, until the final or most significant eight bits are read. When the first processor read in a sequence is detected by the lowest processor read detect circuitry 206 (FIG. 4 or FIG. 5A), the resolver to digital conversion circuitry 38 or 138 is inhibited from changing value by the position change lockout circuitry 42 or 204 until the last byte in a read sequence has been completed as detected by a high read detect circuit 208 or 210 and 212 and the position change lockout circuitry 212 or 204. Because changes in the position data are inhibited only while the processor 44 is actually reading that data, the processor 44 receives only the most recent position data. Further, there is also no need for the processor to spend valuable computation time sending an inhibit command to the resolver input module 34.

The resolver input module 34 and the circuitry 38 on 138 therein of the present inVention provide a number of advantages over circuitry utilized in prior art controls system, some of which advantages have been described above and others of which are inherent in the present invention. Also modifications can be made to the circuitry 38 or 138 without departing from the teachings of the invention. Accordingly, the scope of the invention is only to be limited as necessitated by the accompanying claims.

We claim:

1. A programmable controller system which is coupled to a resolver, said system including a rack mounting circuit modules and having a PLC backplane (a circuit connector board), a programmable controller logic processor connected to said backplane, a resolver analog-to-digital decoder circuit module mountable in said rack for being coupled directly to and through said PLC backplane to said logic processor, and transmission line coupling means for coupling analog output signals from a resolver to said resolver analog-to-digital decoder circuit module forming part of said controller system.

2. A programmable controller system comprising ratio-metric resolver analog-to-digital decoding circuitry adapted to be coupled to a resolver and offsetting means for digitally offsetting the digital resolver position output signal from said decoding circuitry by a user's selectable amount.

3. The programmable controller system of claim 2 wherein said offsetting means for digitally offsetting the digital resolver position output signal by a user selectable amount includes user offset entry means operable by a user for entering a user offset number and combining means for combining the offset entered with the digital resolver position output signal from said ratio-metric analog-to-digital decoding circuitry.

4. The controller system of claim 3 wherein said user offset entry means includes switch means for entering the user offset number and offset conversion PROM circuitry coupled between said switch means and said combining means.

5. A programmable controller system for use with a resolver, said system comprising: ratio-metric analog-to-digital resolver conversion circuitry adapted to be coupled to a resolver for receiving analog signals therefrom and for converting said analog signals to digital signals indicating the shaft position of a machine shaft, offset means for digitally offsetting the output from said analog-to-digital resolver conversion circuitry, selectable scale factor means for selectively establishing a scale factor for said offset digital output signal, and means for supplying the offset digital output signal to said scale factor means.

6. The controller system of claim 5 wherein said offset means is constructed to provide a desired offset for different scale factors.

7. A programmable controller system for use with a resolver, said system comprising analog-to-digital resolver conversion circuitry coupled to said resolver and adapted to provide digital output signals indicative of the shaft position of a machine shaft to which the resolver is mechanically connected, user operable entry means for entering a desired offset in binary coded decimal, conversion means coupled to said entry means for converting said binary coded decimal (BCD) to a digital signal, means for combining the output signal from said conversion circuitry with the output from said conversion means, and means for converting the combined digital signals from digital to binary coded decimal.

8. The controller system of claim 7 wherein said conversion means for converting the user inputted binary coded decimal to a digital signal comprises a high offset conversion PROM and a low offset conversion PROM.

9. The controller system of claim 7 wherein said means for converting the combined digital signals to a binary coded decimal includes a low offset plus position BCD conversion PROM and a high offset plus position BCD conversion PROM.

10. A programmable controller system which is adapted to be coupled to a resolver and which comprises analog-to-digital resolver conversion circuitry adapted to be coupled to the output of said resolver for converting the analog output signal from the resolver to a digital signal indicative of the position of the machine shaft, and user operable means for entering a binary coded decimal offset factor into the circuitry of said resolver conversion circuitry.

11. For use with a programmable controller adapted to be coupled to the output of a resolver, a resolver analog-to-digital decoder circuit module comprising; resolver signal analog-to-digital conversion circuit means, entry means for entering an offset factor to said circuit means, converting means coupled to said entry means for converting an entered binary coded decimal to a digital signal, means for combining the digital output signals from said converting means and from said resolver conversion circuit means, and means for scaling the output of the combined signal.

12. The circuit module of claim 11 wherein said converting means includes means for introducing a scale factor into the offset digital output signal.

13. The circuit module of claim 11 for use with a dual resolver having coarse resolver output signals and fine resolver output signals, said resolver signal analog-to-digital conversion circuit means including coarse resolver to digital conversion circuit means adapted to be coupled to the coarse resolver output, fine resolver analog-to-digital conversion circuit means adapted to be coupled to the fine resolver output, and resolver synchronization logic circuit means coupled to the outputs of said course and fine conversion circuit means and having an output that is coupled to said combining means.

14. The circuit module of claim 13 wherein said resolver synchronization logic circuit means includes means for electronically synchronizing and aligning the data signals from said coarse conversion circuit means with the data signals from said fine conversion circuit means.

15. In a programmable controller system which is coupled to a dual resolver, the improvement comprising: resolver analog-to-digital conversion circuit means coupled to the output of a dual resolver and including coarse resolver analog-to-digital conversion circuit means, fine resolver analog-to-digital conversion circuit means, and resolver synchronization logic circuitry coupled to the outputs of said coarse digital conversion circuit means and said fine digital conversion circuit means and including alignment means for comparing digital data bits from said coarse digital conversion circuit means with digital data bits from said fine digital conversion circuit means, means for determining from a comparison of these data bits the misalignment between the coarse resolver analog signal and the fine resolver analog signal due to any mechanical misalignment resulting from the geared connection between the two resolvers to a machine shaft, and means for electrically aligning the respective digital conversion of the zero position signals from said coarse resolver with those from said fine resolver.

16. In a programmable controller system which is adapted to be coupled to a dual resolver, the improvement comprising: resolver analog-to-digital conversion circuitry coupled to the output of a dual resolver and including coarse resolver analog-to-digital conversion circuit means and fine resolver analog-to-digital conversion circuit means, and resolver synchronization logic and alignment circuit means coupled to the outputs of said coarse digital conversion circuit means and said fine digital conversion circuit means and including means for determining from a comparison of the misalignment between the coarse resolver analog signal and the fine resolver analog signal due to any mechanical misalignment resulting from the geared connections between the two resolvers to a machine shaft, and alignment means for electrically aligning the digital data bits converted from the zero position output signals generated from the coarse resolver with the digital data bits converted from the zero position output signals generated from said fine resolver.

17. The resolver conversion circuitry of claim 16 wherein said aligning means comprises: means for determining the misalignment of any bits of data and correcting means for correcting for said misalignment.

18. The resolver conversion circuitry of claim 17 wherein said correcting means for correcting for said misalignment of data bits includes circuit means for ignoring misaligned data bits.

19. The resolver conversion circuitry of claim 17 wherein said correcting means includes means for adding or subtracting a misalignment factor to the digitally converted combined dual resolver output signals, a digital composite signal.

20. The resolver conversion circuitry of claim 17, including circuit means for coupling said composite digitized electronically aligned dual resolver output signals to an I/O bus coupled to a logic processor of a programmable controller system, said circuit means including position change lockout circuit means for synchronizing the supplying of the composite digitized output signals to the logic processor with the operation of the logic processor.

21. In a programmable controller system including a logic processor and at least one resolver decoder input module, the improvement comprising position change lockout circuit means in said circuit module for locking out new resolver shaft position signals from said logic processor until said processor has completed processing current resolver shaft position signals, thereby, functioning as a P.C. handshake circuit for synchronizing the processing of resolver output signals with the operation of said logic processor.

* * * * *